Patented Sept. 6, 1927.

1,641,803

UNITED STATES PATENT OFFICE.

PHILO H. DANLY, OF CHICAGO, ILLINOIS, ASSIGNOR TO INTERNATIONAL HARVESTER COMPANY, OF CHICAGO, ILLINOIS, A CORPORATION OF NEW JERSEY.

TRACTOR.

Application filed March 22, 1923, Serial No. 626,732. Renewed July 25, 1927.

My invention relates to tractors and particularly to improvements in tractors of the type shown in my co-pending application Serial No. 553,430, filed April 17, 1922.

Among the objects of my invention are to improve and simplify the frame construction, the transmission and driving mechanism, the lifting shaft driving means, the power take-off and generally to improve the entire tractor.

Another object is to provide a single casing which houses substantially all of the operative mechanism of the tractor and also forms the rear axle and part of the tractor frame.

The above and other objects are obtained by my invention which for purposes of illustration is embodied in the tractor shown in the accompanying drawings in which—

In the drawings, I have shown my invention embodied in a three wheel reversible tractor having one end supported on two driving or traction wheels and the other end carried by a supporting or steering wheel. In the following description, I shall refer to the traction wheels as being mounted on the rear end and the supporting wheel as being at the front end but it is to be understood that these terms "rear" and "front" are used only to distinguish the two ends and are not to be considered as limiting the tractor to operation in any one direction since the tractor is operable equally well and at the same number of speeds in both directions. It will also be understood that the traction wheels may be steered in conjunction with the front steering wheel and I have not illustrated the means for doing this since it is fully disclosed in my co-pending application referred to above and forms no part of the present invention. However, in Fig. 5, I have shown one of the brake drums on the end of the differential shaft by means of which the associated traction wheel may be retarded and the opposite traction wheel accelerated for the purpose of steering.

Figure 1:
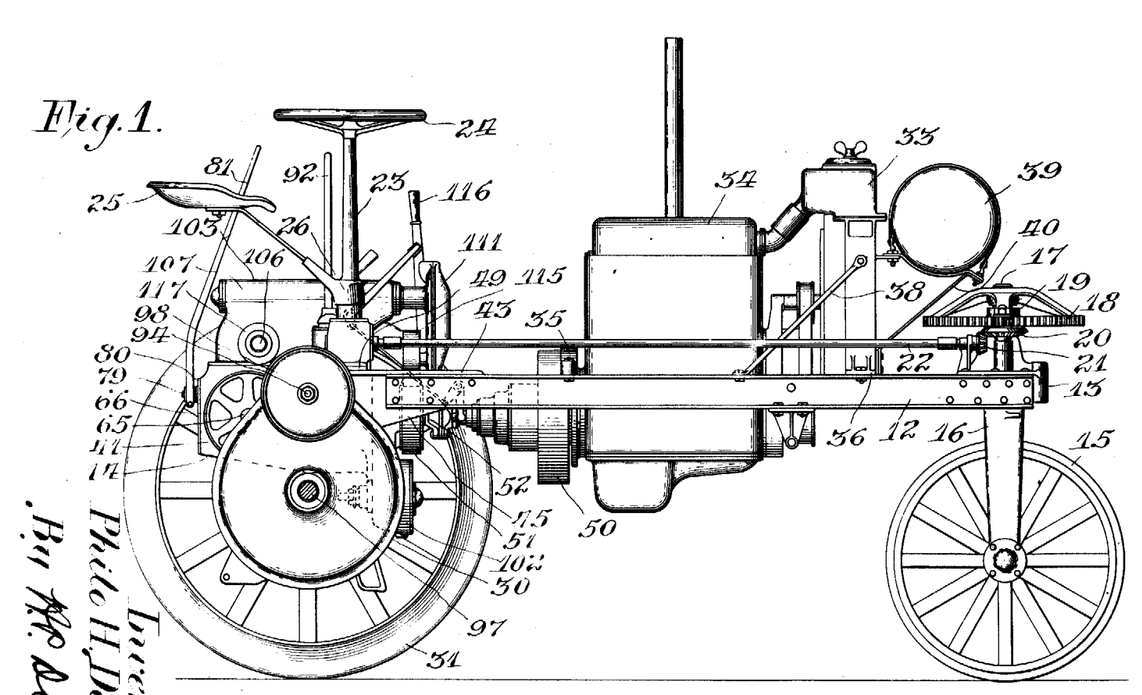
Fig. 1 is a side elevation, the traction wheel toward the observer being omitted.
Figure 2:
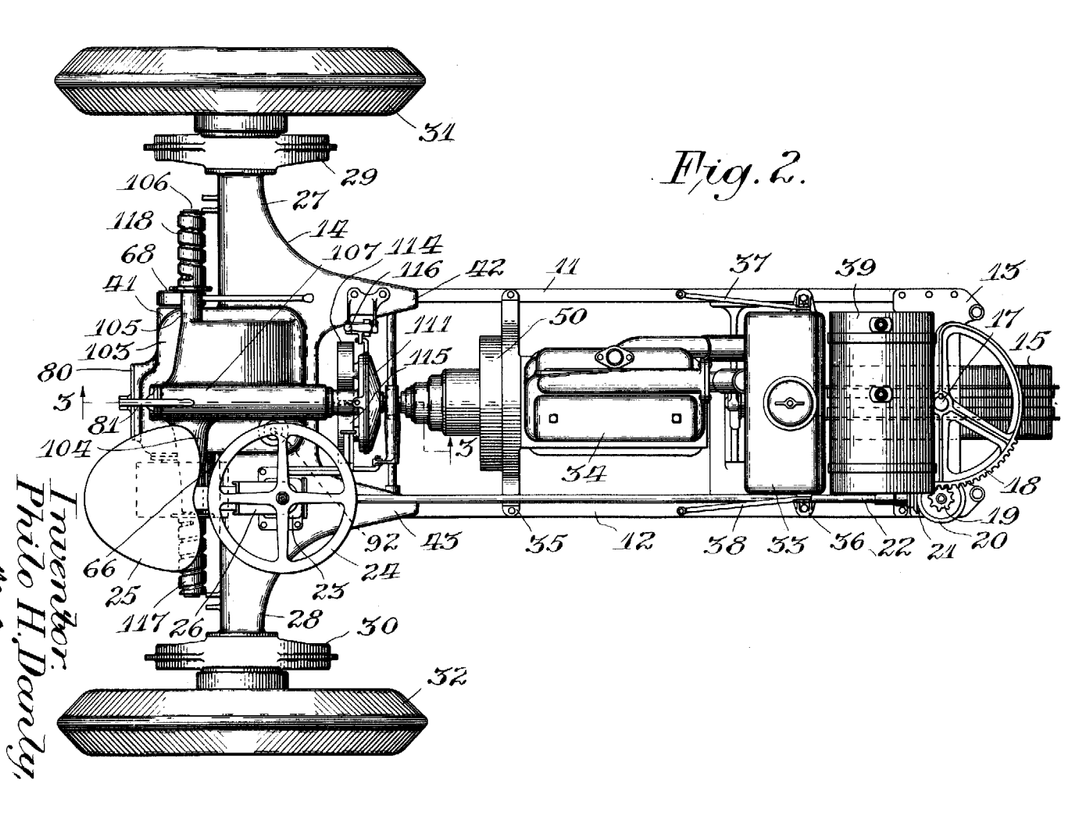
Fig. 2 is a plan.

Referring to Figs. 1 and 2, the tractor has side frame members 11, 12 secured at their front ends to a bolster 13 and at their rear ends to a casting 14 which forms the rear axle and a casing or housing for the transmission and differential gearing. A steering wheel 15 is mounted in a yoke 16 having a vertical shaft 17 journaled in the bolster 13 and at its upper end is keyed to a segment 18 meshing with a spur gear 19 secured to or integral with a bevel gear 20. The bevel gear 20 meshes with a pinion 21 secured to the front end of a steering shaft 22, the rear end of which is journaled in the lower end of a vertical stering post and seat support 23 supported on the casing 14. A steering wheel 24 mounted on the upper end of the post is operatively connected to the shaft 22 to steer the wheel 15. A seat 25 is supported by a collar 26 encircling the post and may be turned on the post in any desired direction for forward and reverse drive of the tractor.

The casting 14 has a central hollow body or casing and two laterally extending arms 27, 28, the outer ends of which are connected to depending gear casings 29, 30 on which the traction wheels 31, 32 are mounted, the casting 14 and casings 29—30 together forming an arched structure. A radiator 33 and engine 34 are supported on the frame members 11 and 12 by brackets 35, 36 which also serve to brace the frame, the radiator being further braced by brace rods 37, 38. A fuel tank 39 is supported by brackets 40 in front of the radiator.

Figures 5, 9, 10:
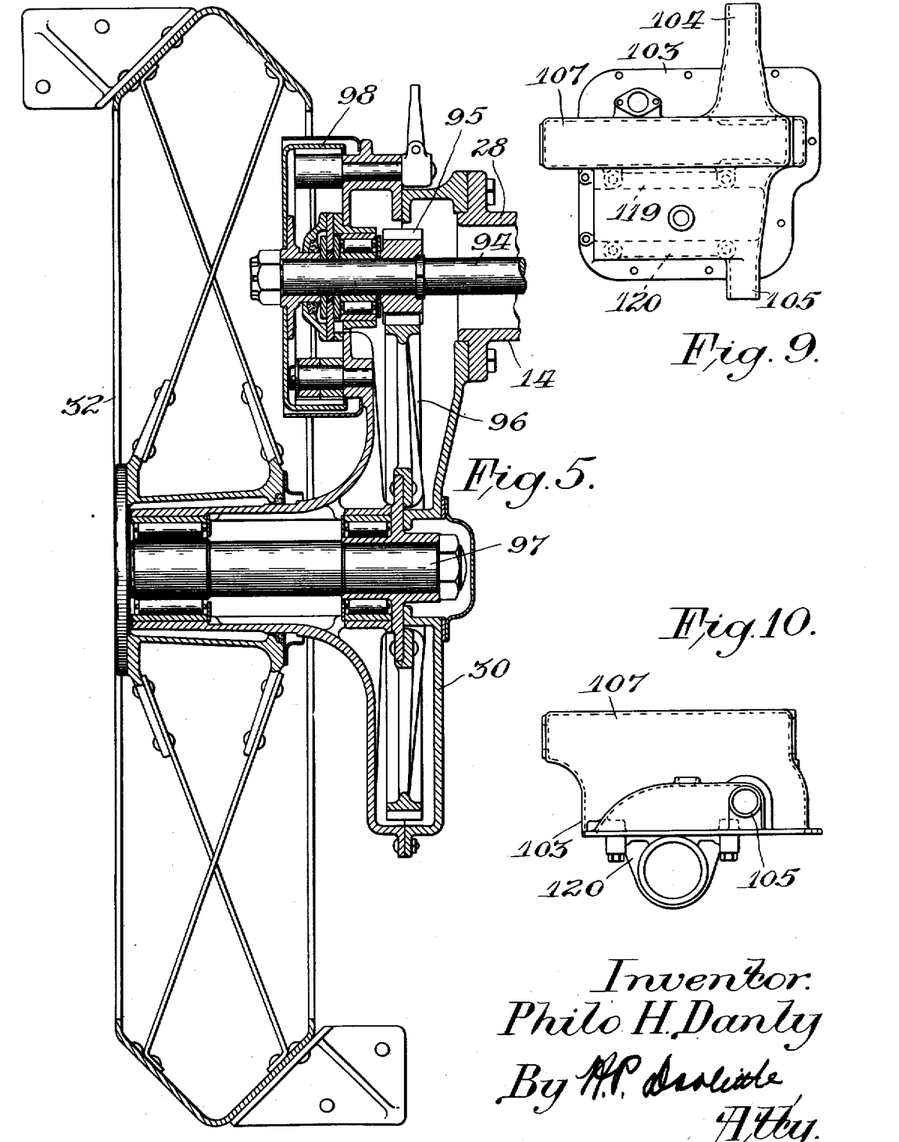
Fig. 5 is a vertical section through one of the traction wheels and driving means.
Figs. 9 and 10 shows a plan and side elevation respectively of the transmission casing cover.
Figure 6:
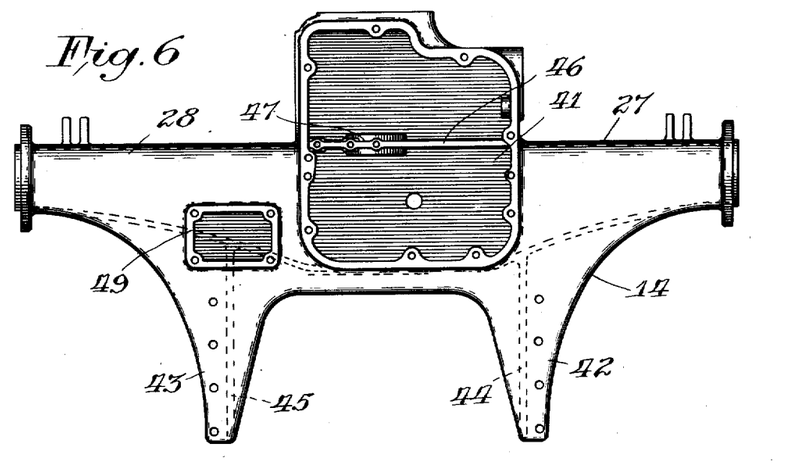
Figs. 6, 7 and 8 are plan, side, and end views of the transmission casing and rear axle.
Figure 7:
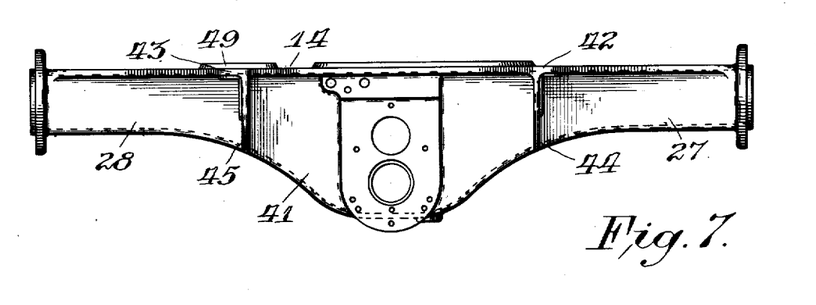
Figure 8:
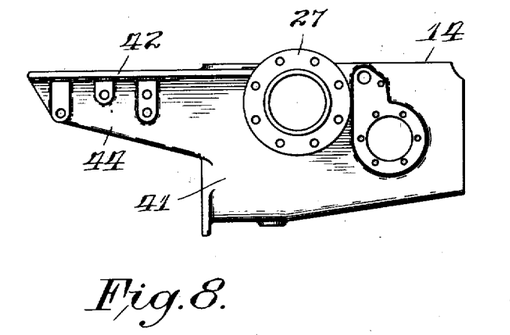

Referring to Figs. 6 to 8, the casting 14 has a hollow body portion 41 in which the transmission and differential mechanism are housed and two laterally extending hollow arms 27, 28 in which the differential driving shafts are journaled and which together with the body portion form the axle. A pair of forwardly extending wings 42, 43 have depending flanges 44, 45 which are drilled to receive bolts or rivets for securing the frame members 11, 12. The hollow body portion 41 is divided by a partition 46 in which bearings 47, 48 are provided for the rear ends of the transmission shafts (see Fig. 3). The casing is open on its top side and is closed by the cover shown in Figs. 9 and 10. A boss 49 on top of the casing affords a support for the post 23. It will be noted that the flanges 42, 43 increase in width toward the rear end and gradually merge into the body portion and hollow arms of the main casting. The engine 34 has the usual fly wheel and clutch 50 for transmitting power to the transmission mechanism.

Power for driving the implement adjusting or lifting shaft is taken from a friction pulley 51 keyed to the driving shaft 52 adjacent the clutch. The transmission casing has a cover 53 in which the shaft 52 is mounted, the shaft having a gear 54 at its inner end preferably formed integral therewith. A driven shaft 55 is mounted in the casing in alignment with the shaft 52 and has two gears 56, 57 splined thereon. The gear 54 meshes with a gear 58 keyed to an intermediate shaft 59 on which are fixed the gears 60, 61 adapted to mesh with the gears 56, 57 respectively. The gears 54 and 57 have cooperating clutch elements adapted to be engaged by shifting the gear 57 for direct drive of the shaft 55 from the shaft 52. The rear end of the shaft 55 is supported in the bearing 47 and carries a bevel gear 62 meshing with two bevel gears 63, 64, the gear 64 being formed integrally with a shaft 65 carrying a belt pulley 66 and the gear 63 being rotatably mounted on a shaft 67, the inner end of which is supported in a bearing in the gear 64 while the outer end is supported in a bearing in the casing wall. The outer end of the shaft 67 extends beyond the casing and carries the brake drum 68. Within the casing the shaft 67 carries the bull pinion 69 meshing with the bull gear 70 of the differential 71. The bevel gears 63, 64 are provided with clutch elements 72, 73 adapted to be engaged by a clutch sleeve 74 splined on the inner end of the shaft 67 between the beveled gears. The sleeve 74 is connected by a fork 75 clamped to the shipper rod 76. The rod has three notches 77 near one end adapted to be engaged by a detent 78 to hold the sleeve 74 in engagement with either of the beveled gears or out of engagement with both. The clutch sleeve is shifted by a shipper arm 79 rotatably supported in a rear cover plate 80 of the casing. one end of the arm being connected to the fork 75, the other end being connected to the clutch lever 81.

Referring to the transmission mechanism, the gear 57 has a groove engaged by a fork 82 secured to a sleeve 83 slidable on a rod 84. The gear 56 is engaged by a similar fork 85 secured to a sleeve 86 slidable on a rod 87 parallel to the rod 84. A flat bar 88 secured in the front wall of the transmission casing extends between the collars 83, 86 and has a notch 89 with which notches 90, 91 in the respective sleeves are adapted to register. A gear shift lever 92 is adapted to engage in either of the notches to shift the respective gears 56 and 57. With the gears in the position shown in Fig. 3, the shafts 52 and 59 will rotate but the shaft 55 is stationary. The gear 57 is shifted into mesh with the gear 61 for low speed drive of the tractor and is shifted into engagement with the clutch on the gear 54 for intermediate speed while the gear 56 is shifted into mesh with the gear 60 for high speed drive of the tractor. It will be noted that the shafts 52 and 55 are directly engaged by the clutches 54, 57 for intermediate speed which is the speed at which the tractor does its heaviest work and is most frequently used. The shaft 55, bevel gears 62, 63 and 64 and the belt pulley 66 may be driven at three different speeds through the gearing just described. The collar 74 may be shifted by the lever 81 into engagement with either of the gears 63 or 64 which rotate in opposite directions so that the shaft 67 and the differential mechanism 71 may be driven at three speeds forward and three speeds reverse. I have found this to be a very advantageous driving means in tractors of this type which are adapted to use a wide variety of implements, some of which are attached to one end of the tractor and others to the opposite end so that the tractor must operate equally well in each direction.

Two differential shafts 93, 94 extend in opposite directions from the differential 71 through the hollow arms or axles 27, 28. Near its outer end, each of the shafts carries a pinion 95 meshing with a gear 96 secured to another shaft 97 mounted in roller bearings in the casings 29, 30 as shown in Fig. 5, the other end of the shaft 97 being secured to the drive wheels 31, 32. Beyond the pinion 95, each of the shafts 93, 94 carries a brake drum 98 for power steering of the drive wheels as described in my co-pending application above referred to.

Figure 3:
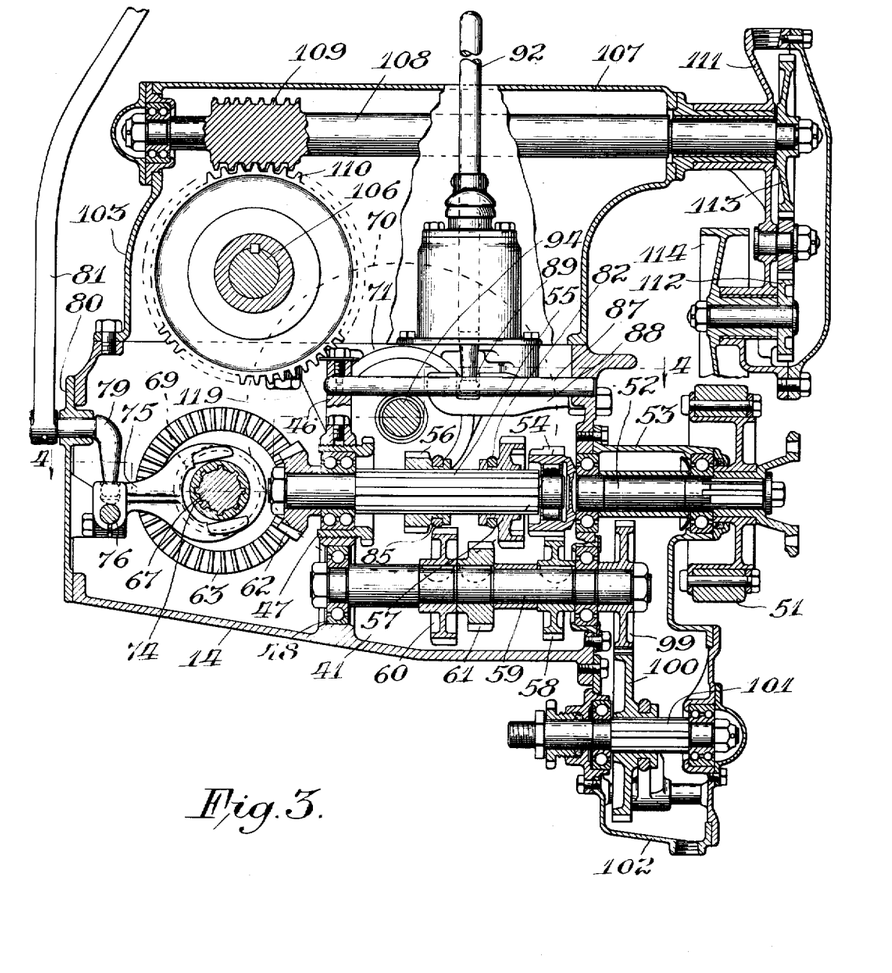
Fig. 3 is a section taken substantially on the line 3—3 of Fig. 2.

Referring to Fig. 3, the shaft 59 carries a gear 99 adapted to mesh with a gear 100 slidable on a power take-off shaft 101 journaled in a bearing in a casing 102 secured to the main casing 14.

Figure 4:
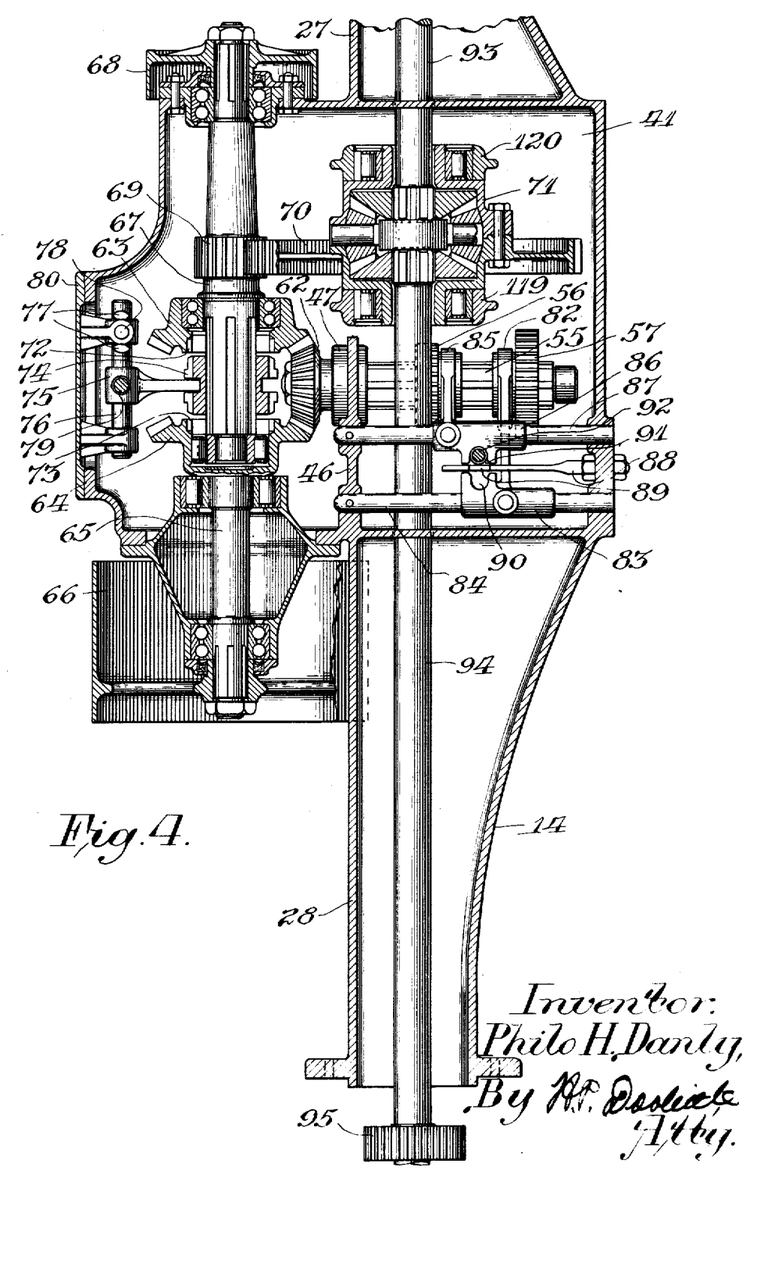
Fig. 4 is a section taken substantially on the line 4—4 of Fig. 3.

The body portion 41 of the casing 14 is closed by a cover plate 103 carrying the implement adjusting mechanism. The cover 103 has two oppositely extending sleeves or arms 104, 105 in which the adjusting shaft 106 is supported. A hollow boss 107 extends across the cover transversely of the arms 104, 105 and supports a worm shaft 108 carrying a worm 109 meshing with a worm wheel 110 keyed to the shaft 106. The shaft 108 extends to the front beyond the cover and supports a movable casing 111 within which there are a plurality of gears 112 meshing with a gear 113 on the end of the shaft 108. Two friction pulleys 114, 115 are secured to the outer ends of short shafts on the inner end of which gears 112 are secured. The casing 111 is adapted to be tilted about the axis of the shaft 108 by a lever 116 to bring one or the other of the friction pulleys 114 or 115 into contact with the friction pulley 51 to rotate the adjusting shaft 106 in opposite directions in substantially the same manner as shown in my co-pending application. Drums 117 and 118 are secured to the outer ends of the adjusting shaft 106 and chains or ropes may be wound thereon to raise or lower the implement being operated by the tractor. Two bearing rings 119 and 120 bolted to the underside of the cover support the differential 71 as shown in Figs. 4, 9 and 10.

Having thus described my invention, what I claim as new and desire to secure by Letters Patent is:

1. In a tractor, a rear axle casting having a hollow body compressing a housing, a change speed transmission gearing in the housing, a differential gear mechanism including differential shafts in the housing, a pulley shaft journaled in the housing and projecting therefrom and operable by the change speed transmission gearing, and a power take off shaft also journaled in the housing and projecting therefrom and also operable by the change speed transmission gearing.

2. In a tractor, a rear axle casting having a central hollow body and horizontal arms connected to depending end casings together forming an arched structure, differential drive mechanism and transmission gearing housed in the body, a power shaft and a pulley shaft journaled in the under portion of said body and projecting therefrom at points below the arms of the axle casting, and a driving connection between the transmission and the power and pulley shafts respectively.

3. In a tractor, a main axle casting having a central hollow body and depending end casings together forming an arched structure, differential drive mechanism and transmission mechanism housed in the body, a laterally extending pulley shaft and a rearwardly extending power shaft journaled in and projecting from the lower portion of the body of the axle casting, driving connections between the transmission and said pulley and power shafts respectively, and separate controls for the driving connections of said shafts.

4. In a tractor, a casing, a shaft journaled therein and having a bevel gear at one end, means for driving the shaft at a plurality of speeds, a transverse shaft in the casing and extending therebeyond at one end, a brake drum carried by the extended end of the shaft, a pair of bevel gears rotatably mounted on the transverse shaft within the casing and meshing with opposite sides of the first mentioned bevel gear, clutch elements on said pair of bevel gears, a clutch sleeve slidable on the transverse shaft between the bevel gears and adapted to operatively connect either gear to the transverse shaft, a differential mounted in the casing, and driving connections from the transverse shaft to the differential.

5. In a tractor, a casing, a shaft journaled therein and having a bevel gear at one end, means for driving the shaft at a plurality of speeds, a transverse shaft in the casing and extending therebeyond at one end, a brake drum carried by the extending end of the shaft, a pair of bevel gears rotatably mounted on the transverse shaft within the casing and meshing with opposite sides of the first mentioned bevel gear, clutch elements on said pair of bevel gears, a clutch sleeve slidable on the transverse shaft between the bevel gears and adapted to operatively connect either gear to the transverse shaft, a power shaft fixed to one of the bevel gears and extending beyond the casing, and a belt pulley mounted on the extended end of the power shaft.

6. In a tractor, a casing, transmission and differential mechanism mounted therein, a cover for the casing, an adjusting shaft rotatably mounted in the cover, a second shaft journaled in the cover and extending therebeyond at one end, means for driving the adjusting shaft from the second shaft, reversible gearing operatively connected to the extended end of the second shaft and means for driving the transmission mechanism and reversible gearing.

7. In a tractor, a casing, transmission and differential mechanism mounted therein, a cover for the casing, an adjusting shaft rotatably mounted in the cover, a second shaft journaled in the cover, means for driving the adjusting shaft from the second shaft, reversible gearing operatively connected to the second shaft and means for driving the transmission mechanism and reversible gearing.

8. In a tractor, a casing, transmission and differential gearing mounted therein, a cover for the casing, an adjusting shaft rotatably mounted in the casing, a second shaft journaled in the cover above the adjusting shaft and extending transversely thereof, driving connections between the second shaft and adjusting shaft, reversible gearing for driving the second shaft in opposite directions and means for driving the transmission gearing and reversible gearing.

9. In a tractor, a casing, a cover therefor, an adjusting shaft mounted in the cover, a second shaft mounted in the cover above the adjusting shaft and extending beyond the cover at one end, driving connections between the shafts within the cover, a second casing mounted to oscillate on the extended end of the second shaft, a pair of friction pulleys rotatably supported on the casing, driving connections between the friction pulleys and the end of the second shaft, a driving shaft, a friction pulley thereon and means for oscillating the second casing so that either of the first mentioned friction pulleys may engage the last mentioned friction pulley.

10. In a tractor, a rear axle casting having a central hollow body, a power shaft journaled therein and having a bevel gear at one end, a pair of transverse shafts journaled in the body in longitudinal alignment and extending through opposite sides thereof, a pair of bevel gears on said transverse shafts meshing with the first mentioned bevel gear, a brake drum on one of said transverse shafts outside the body, and a belt pulley on the other transverse shaft outside the body.

11. In a tractor, a rear axle casting having a central hollow body, a drive shaft journaled therein and carrying a bevel gear, a brake shaft journaled in one side of the body and having a bevel gear rotatably mounted thereon intermediate its ends and meshing with the first mentioned bevel gear, a power shaft journaled in the opposite side of the body in alignment with the brake shaft and having a bevel gear fixed thereon meshing with the first mentioned bevel gear, a bearing on the inner end of the power shaft in which the inner end of the brake shaft is rotatably mounted, a brake drum secured to the outer end of the brake shaft, and a belt pulley secured to the outer end of the power shaft.

12. In a tractor having longitudinal frame members, a rear axle casting disposed transversley across the frame members and having a hollow body compressing a housing, a change speed transmission gearing in the housing, a differential gear mechanism including transversely arranged differential shafts in the housing, a transversely disposed pulley shaft journaled in the housing and projecting therefrom and operable by the change speed transmission gearing, and a longitudinally disposed power take off shaft journaled in the housing and projecting rearwardly therefrom and also operable by the change speed transmission gearing.

In testimony whereof I affix my signature.

PHILO H. DANLY.

tween the shafts within the cover, a second casing mounted to oscillate on the extended end of the second shaft, a pair of friction pulleys rotatably supported on the casing, driving connections between the friction pulleys and the end of the second shaft, a driving shaft, a friction pulley thereon and means for oscillating the second casing so that either of the first mentioned friction pulleys may engage the last mentioned friction pulley.

10. In a tractor, a rear axle casting having a central hollow body, a power shaft journaled therein and having a bevel gear at one end, a pair of transverse shafts journaled in the body in longitudinal alignment and extending through opposite sides thereof, a pair of bevel gears on said transverse shafts meshing with the first mentioned bevel gear, a brake drum on one of said transverse shafts outside the body, and a belt pulley on the other transverse shaft outside the body.

11. In a tractor, a rear axle casting having a central hollow body, a drive shaft journaled therein and carrying a bevel gear, a brake shaft journaled in one side of the body and having a bevel gear rotatably mounted thereon intermediate its ends and meshing with the first mentioned bevel gear, a power shaft journaled in the opposite side of the body in alignment with the brake shaft and having a bevel gear fixed thereon meshing with the first mentioned bevel gear, a bearing on the inner end of the power shaft in which the inner end of the brake shaft is rotatably mounted, a brake drum secured to the outer end of the brake shaft, and a belt pulley secured to the outer end of the power shaft.

12. In a tractor having longitudinal frame members, a rear axle casting disposed transversley across the frame members and having a hollow body compressing a housing, a change speed transmission gearing in the housing, a differential gear mechanism including transversely arranged differential shafts in the housing, a transversely disposed pulley shaft journaled in the housing and projecting therefrom and operable by the change speed transmission gearing, and a longitudinally disposed power take off shaft journaled in the housing and projecting rearwardly therefrom and also operable by the change speed transmission gearing.

In testimony whereof I affix my signature.

PHILO H. DANLY.

Certificate of Correction.

Patent No. 1,641,803.     Granted September 6, 1927, to

PHILO H. DANLY.

It is hereby certified that error appears in the printed specification of the above-numbered patent requiring correction as follows: Page 1, line 76, for the misspelled word " stering " read steering; Page 3, line 23, claim 1, and page 4, line 43, claim 12, for " compressing " read comprising; and that the said Letters Patent should be read with these corrections therein that the same may conform to the record of the case in the Patent Office.

Signed and sealed this 18th day of October, A. D. 1927.

[SEAL.]

M. J. MOORE,
Acting Commissioner of Patents.

Certificate of Correction.

Patent No. 1,641,803. Granted September 6, 1927, to

PHILO H. DANLY.

It is hereby certified that error appears in the printed specification of the above-numbered patent requiring correction as follows: Page 1, line 76, for the misspelled word " stering " read *steering;* Page 3, line 23, claim 1, and page 4, line 43, claim 12, for " compressing " read *comprising;* and that the said Letters Patent should be read with these corrections therein that the same may conform to the record of the case in the Patent Office.

Signed and sealed this 18th day of October, A. D. 1927.

[SEAL.]

M. J. MOORE,
*Acting Commissioner of Patents.*